Patented June 15, 1954

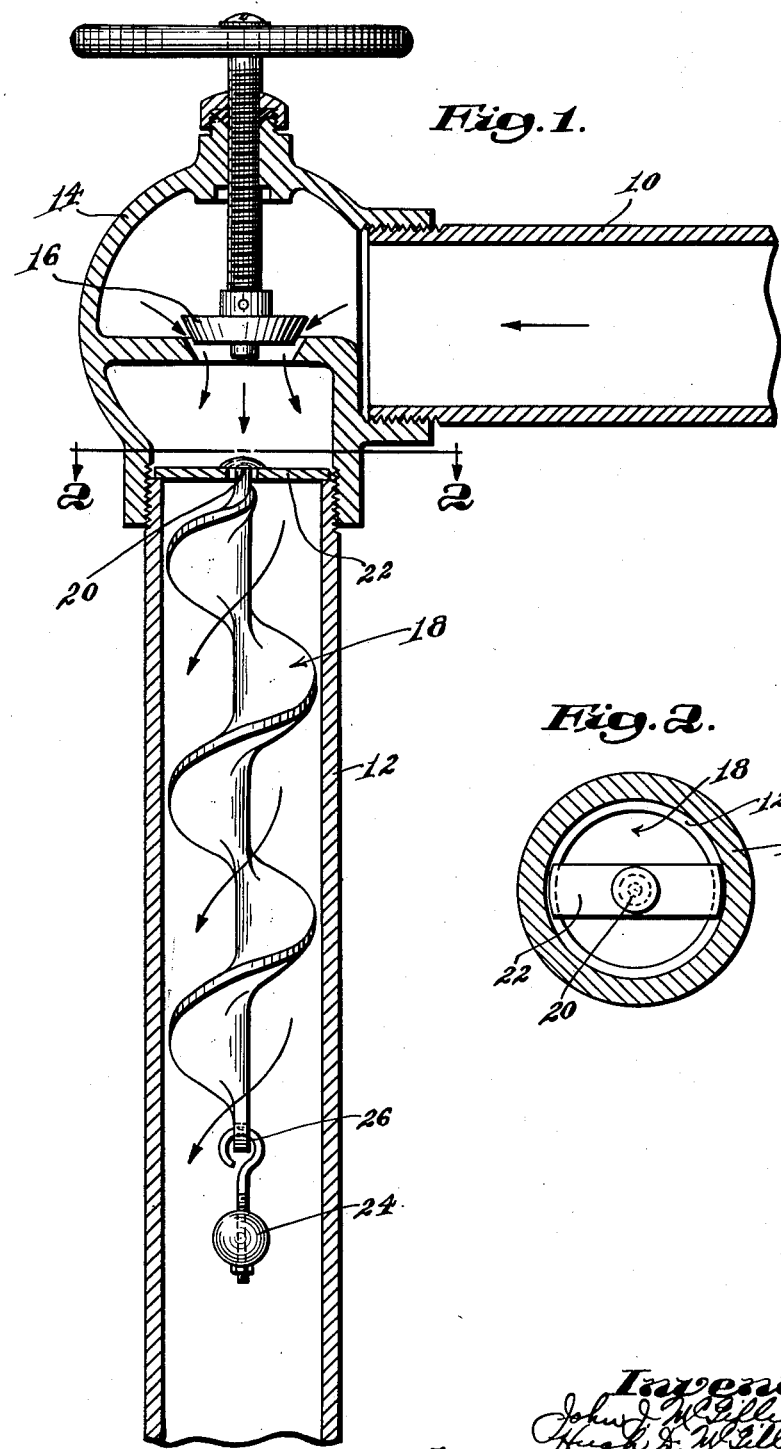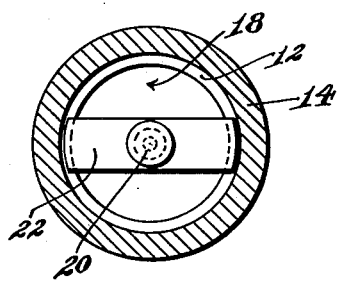

2,681,031

UNITED STATES PATENT OFFICE 2,681,031

FLUID-FLOW SIGNAL

John J. McGillis and Hugh D. McGillis,
Brockton, Mass.

Application August 28, 1951, Serial No. 244,082

1 Claim. (Cl. 116—112)

This invention relates to improvements in fluid-flow signalling apparatus. More especially it relates to an audible signalling means which readily may be mounted in a conventional pipe, in advance of a flow-control valve in the direction of flow, for giving an audible signal when the valve is open. The invention has particular utility in connection with supply conduits to storage tanks and the like, for example, to provide a continuous audible signal when the supply valve is open thereby to remind the person who opened the valve, or to warn anyone else in the vicinity, of the need for closing the valve. It frequently happens that one opens a flow-control valve to replenish the supply of water in a storage tank and then goes about some other task while the supply in the tank is being replenished. The open valve may be forgotten until water over-flowing from the tank causes damage. Sometimes, also, a person may become confused and be uncertain as to whether a flow-control valve should be turned one way or the other to close it, with the result that he may go away believing he has closed the valve when actually he has left it wide open. The invention provides a fluid-flow signalling means which responds to fluid-flow through a conduit to give an audible signal which is continuous so long as the flow continues, whereby anyone in the vicinity is made aware that the control valve has been temporarily opened, or mistakenly left open, and needs to be closed before damage results.

It is among the objects of the invention to provide a fluid-flow signal which simply and economically may be mounted within a flow conduit, beyond a flow-control valve in the direction of flow through the conduit, and which responds to any appreciable flow through the conduit to produce an audible signal so long as the flow continues. The signal may be a loosely mounted member retained at a coupling connection of the conduit and projecting loosely within the conduit for coaction with the conduit walls to produce a rattling sound in response to movements of the signal member produced by fluid-flow in the conduit.

Another object is to provide a fluid-flow signal having a signalling member of generally spiral form which may be loosely mounted in a flow conduit to provide a generally spiral course for fluid flowing in the conduit past the loose signalling member therein, whereby the signalling member coacts with the conduit walls to provide a rattling sound in response to flow through the conduit. The signalling member preferably is loosely retained at one of its ends with ability to rotate and rattle within the conduit when water or other fluid flows past it.

It is, moreover, our purpose and object generally to improve the structure and effectiveness of fluid-flow signalling apparatus and especially audible signalling means operable constantly so long as there is appreciable flow of fluid through a conduit.

In the accompanying drawing:

Fig. 1 is a medial cross-sectional view of a conduit and flow-control valve casing having signalling means embodying features of the invention mounted therein, the valve and signalling means being represented in elevation; and Fig. 2 is a cross-sectional view on line 2—2 of Fig. 1.

Referring to the drawing, the pipe 10 may lead from any suitable source of water, or other fluid, under pressure, and pipe 12 may lead to a storage tank, or the like, whose supply of water, or other fluid, requires periodic replenishing. The pipes 10, 12 are connected together by a conventional valve casing 14, whose valve 16 is adapted to be manually opened and closed in a conventional manner for controlling flow to the storage tank or other receptacle whose supply of water or other fluid requires periodic replenishing.

According to the invention, an audible signalling means is mounted within one of the flow pipes for producing a distinctive sound or noise whenever valve 16 is open permitting appreciable flow through the pipes 10, 12 and valve casing 14. The signalling means as herein represented is within the pipe 12, being a spiral element 18 of metal, or other suitably rigid material, having considerable length, and fitting in the pipe with looseness therein whereby it may be actuated into rattling contact with the pipe wall in response to the action of fluid in negotiating a spiral course past the signalling element 18. The signalling element 18 is loosely and rotatably secured at 20 to a narrow retaining bar 22 which extends loosely across the end of pipe 12 within the valve casing 14, whereby the signalling element is retained by bar 22 against longitudinal movement in the direction of flow through pipe 12, but can rattle and rotate in the pipe whenever there is any appreciable pressure flow of fluid in pipe 12. Hence, assuming that pipe 10 is connected to a source of fluid under pressure, opening of valve 16 will result in a continuous audible signal so long as the valve continues open, thereby to keep anyone in the vicinity mindful of the fact that the valve 16 is open and needs to be closed before any damage can be caused due to leaving the valve open too long. Also, the audible signal avoids any possibility of the confusion which sometimes has resulted in leaving a flow-control valve open following manual operation of the flow-control valve mistakenly in opening direction when the intention was to operate the valve in closing direction.

In cases where an extra loud signal may be desired, a relatively small ball 24 of metal, or a comparable clapper element, may be pivotally connected at 26 to the free end of signalling element 18 in position to be actuated into clapping relation to the pipe walls in response to flow of fluid past the signalling element 18.

It is intended that the patent shall cover, by suitable expression in the appended claim, whatever features of patentable novelty exist in the invention disclosed.

We claim as our invention:

Liquid-flow signalling apparatus, comprising a valve casing having a manually operable flow-control valve therein, conduit means for conducting liquid to the valve casing on one side of said valve, a second conduit means on the other side of said valve, for conducting liquid from the valve casing when said valve is open, said second conduit means including a separate conduit section whose connection in said second conduit means provides an interior abutment at that end of the separate conduit section which is closer to said valve casing, signalling mechanism loose within said second conduit means and free to move axially and to rotate therein, said signalling mechanism having a projection thereon for coaction with said interior abutment thereby to limit the axial movement of the signalling mechanism in the direction of flow within said second conduit means, said signalling mechanism having a spirally formed portion whereby said mechanism rotates in response to flow of liquid in said second conduit means, and said mechanism having a clapper element thereon for striking said second conduit means in response to rotation of said signalling mechanism, thereby to provide an audible signal so long as said flow-control valve is open.

References Cited in the file of this patent

UNITED STATES PATENTS

| Number | Name | Date |
| --- | --- | --- |
| 238,653 | Conlon | Mar. 8, 1881 |
| 582,872 | Price | May 18, 1897 |
| 1,117,041 | Hanlon | Nov. 10, 1914 |
| 1,287,968 | Greenleaf | Dec. 17, 1918 |
| 1,425,936 | Bailey | Aug. 15, 1922 |
| 1,722,314 | Ryan | July 30, 1929 |
| 1,809,350 | Nicholas | June 9, 1931 |
| 2,103,055 | Beckley | Dec. 21, 1937 |
| 2,539,281 | Smith | Jan. 23, 1951 |
| 2,571,058 | Pearson | Oct. 9, 1951 |